United States Patent [19]

Miranda et al.

[11] Patent Number: 4,517,577

[45] Date of Patent: May 14, 1985

[54] METHOD OF AND APPARATUS FOR PRIMING AN INK JET

[75] Inventors: Hector Miranda, Yorktown Heights; Thomas W. DeYoung, Stormville, both of N.Y.

[73] Assignee: Exxon Research and Engineering Co., Florham Park, N.J.

[21] Appl. No.: 465,519

[22] Filed: Feb. 10, 1983

[51] Int. Cl.[3] .......... G01D 15/18

[52] U.S. Cl. .......... 346/140 R; 346/1.1

[58] Field of Search .......... 346/140 PD, 1.1

[56] References Cited

U.S. PATENT DOCUMENTS

| | | | |
|---|---|---|---|
| 3,974,508 | 8/1976 | Blumenthal | 346/140 PD |
| 4,126,868 | 11/1978 | Kirner | 346/140 PD |
| 4,158,847 | 6/1979 | Heinzl et al. | 346/140 R |
| 4,170,016 | 10/1979 | Gell | 346/140 R |
| 4,240,082 | 12/1980 | Yu | 346/140 R |
| 4,380,770 | 4/1983 | Maruyama | 346/140 PD |

*Primary Examiner*—George H. Miller, Jr.

[57] ABSTRACT

A demand ink jet is primed by flowing ink toward the inlet to the chamber of the jet. Ink which does not enter the inlet to the chamber is permitted to flow past the inlet toward a vent. When priming is completed, the vent is closed.

15 Claims, 7 Drawing Figures

METHOD OF AND APPARATUS FOR PRIMING AN INK JET

BACKGROUND OF THE INVENTION

This invention relates to demand ink jets, and more particularly, to the priming of demand ink jets.

A demand ink jet comprises an ink jet chamber including an orifice and an inlet. In order to ready such a jet for printing, it is necessary to prime the jet, i.e., be sure that the chamber is filled with ink so that changes in the state of energization of the transducer associated with the jet will result in the ejection of a droplet of ink from the orifice of the chamber. The changes in the state of energization of the transducer are on demand, i.e., whenever a droplet of ink is desired at a predetermined location.

Priming of an ink jet can present a substantial problem. In some instances, it is possible, during priming, for air to become trapped in a jet in a manner so as to prevent the proper filling of the chamber associated with the jet. These problems are compounded where a plurality or an array of jets are utilized since one jet may properly prime for a predetermined length of time while another jet will not. It is, of course, imperative in a demand ink jet that each jet in an array be primed for printing upon demand. Unlike a continuous ink jet system, an ink supply to the ink jet chambers is continuously under pressure and the catcher associated with the continuous ink jet system may be utilized until the ink jet is properly ejecting droplets. However, the demand ink jet system operates at substantially ambient pressures and must be properly primed to assure that a droplet of ink will be ejected from the jet upon demand when and only when such a droplet is desired.

SUMMARY OF THE INVENTION

It is an object of this invention to provide a more effective method and means for priming a demand ink jet.

It is also an object of this invention to provide a more effective method and means for priming a plurality of demand ink jets.

In accordance with these and other objects, an ink jet apparatus for producing droplets of ink on demand comprises a chamber for receiving ink including an ink inlet and an orifice for ejecting droplets of ink. The transducer means are coupled to the chamber for creating selective volumetric changes in the chamber in response to the state of energization of the transducer means for ejecting droplets of ink on demand.

In accordance with this invention, the apparatus further comprises ink supply means including an input and a vent for supplying ink to the chamber. The supply means creates a high velocity flow of ink during priming through the supply means from the input, past the inlet to the outlet vent.

In accordance with another important aspect of the invention, a valve means is associated with the vent so as to permit the vent to be opened during priming and closed after priming.

In a particularly preferred embodiment of the invention, the ink jet apparatus comprises a plurality of such chambers and transducer means. The ink supply means comprises manifold means including the input and the vent for supplying ink to the inlets of each of the chambers. The manifold means with the input and the vent creates a high velocity flow of ink through a manifold past the inlets to the chambers to assure priming.

In accordance with another aspect of the invention, the inlets to the chambers are substantially serially arranged along the manifold.

In accordance with a further aspect of the invention, the inlets are substantially aligned.

In accordance with a further aspect of the invention, manifold means comprises a plurality of scoops along the manifold means, the scoops being coupled to the inlets to the chambers.

In accordance with a still further aspect of the invention, the scoops are differentially displaced with respect to the axis of the manifold means. This permits the manifold means to have a reduction in cross-sectional area transverse to the flow of ink at the inlets.

DETAILED DESCRIPTION OF THE PREFERRED EMBODIMENT

Figure 1:
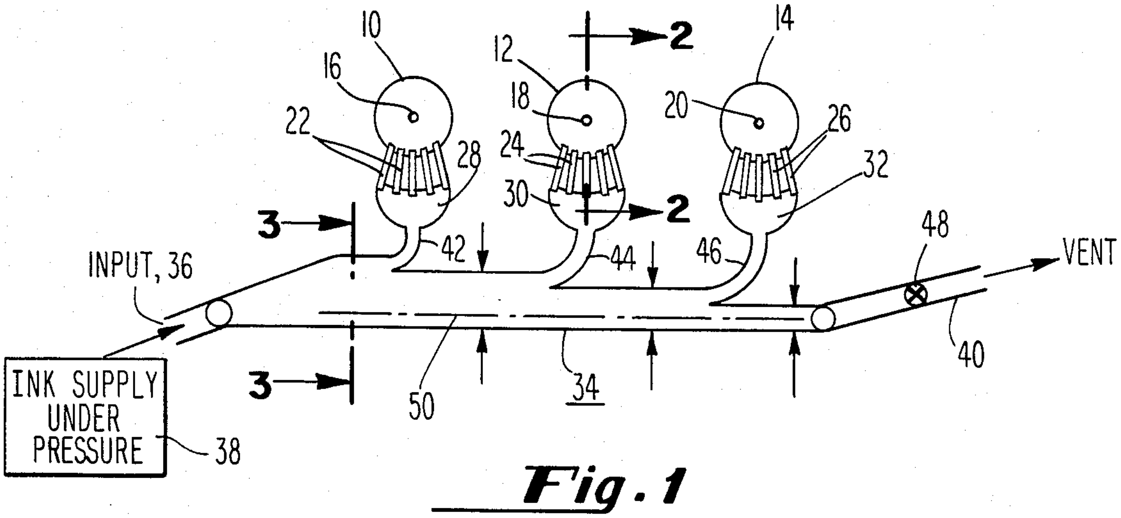
FIG. 1 is a schematic diagram of a plurality of demand ink jets the priming technique of this invention.

Referring to FIG. 1, one embodiment of the invention comprises a plurality or an array of ink jets comprising chambers 10, 12 and 14 having orifices 16, 18 and 20. Each of the chambers 10, 12 and 14 also include an inlet means comprising restrictors 22, 24 and 26 coupled to inlet reservoirs 28, 30 and 32.

In accordance with this invention, the priming of the ink jet is accomplished by ink supply means or manifold 34 including an input 36 coupled to an ink supply under pressure 38 and a vent 40. The manifold 34 is appropriately designed so as to supply a high velocity flow of ink past scoops 42, 44 and 46 leading to the reservoirs 28, 30 and 32. The ink is supplied under pressure to the manifold 34 only during priming.

In accordance with one important aspect of the invention, the vent 40 includes a valve 48. During priming of the ink jets, the valve 48 is open. Once priming has been completed, the valve 48 is closed.

In accordance with another important aspect of the invention, the scoops 42, 44 and 46 are positioned serially along the axis 50 of the manifold 34. Although the scoops 42, 44 and 46 are substantially aligned, they are slightly off set, i.e., differentially displaced with respect to the axis 50 so as to reduce the cross-sectional area transverse to the flow of ink through the manifold 34 at each of the inlets or scoops 42, 44 and 46. This assures high velocity flow past each of the inlets to the various jets.

Figure 2:
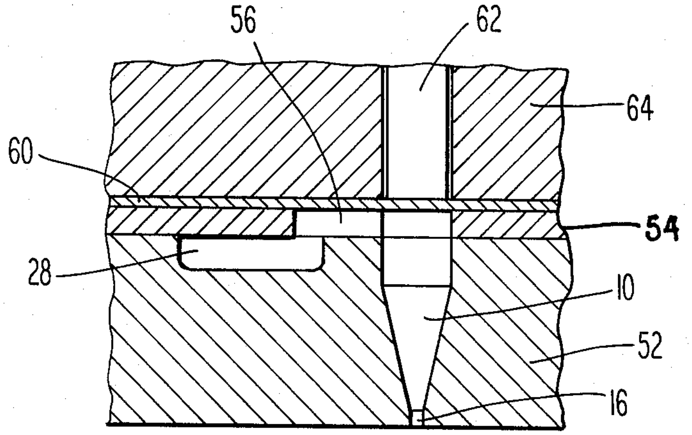
FIG. 2 is a cross-sectional view taken along lines 2—2 of FIG. 1.

The ink jets depicted in FIG. 1 are shown in somewhat more detail in FIG. 2. As shown therein, a plate 52 contains the chamber 10. The plate 54 is juxtaposed to the plate 52 in a manner so as to provide communication between the restrictor 56 formed in the plate 54 which is in communication with the reservoir 28 formed in the plate 52. A plate 60 separates a transducer 62 mounted in a plate 64 from the plate 54 and the chamber 10 in the plate 52. It will be appreciated that the ink jet shown in FIG. 2 is of the demand type. In other words, the expansion and contraction of the transducer 62 is a function of the state of energization of the transducer 62 in a manner so as to produce a droplet of ink from the orifice 16 of the chamber 10 only when a droplet is so desired.

Figure 3:
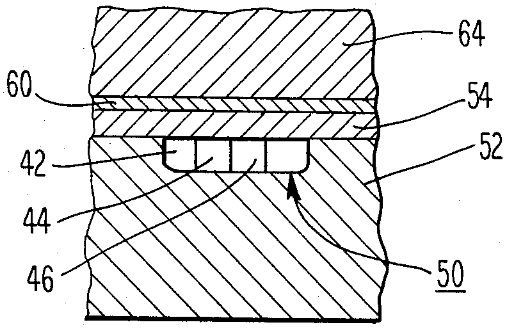
FIG. 3 is a cross-sectional view taken along lines 3—3 of FIG. 1.

FIG. 3 depicts the cross-sectional area of the manifold 50 and the reductions at each of the scoops 42, 44 and 46 in the cross-sectional flow. With the three scoops 42, 44 and 46, as shown in FIGS. 1 and 3, the cross-sectional area is reduced by approximately 15% at each scoop. Preferably, the reductions in cross-sectional area of the manifold 34 will leave at least 25% of the original cross-sectional flow through the manifold 34 in front of the first scoop 42.

A preferred embodiment of the invention will now be described with reference to FIGS. 4 through 7.

Figure 4:
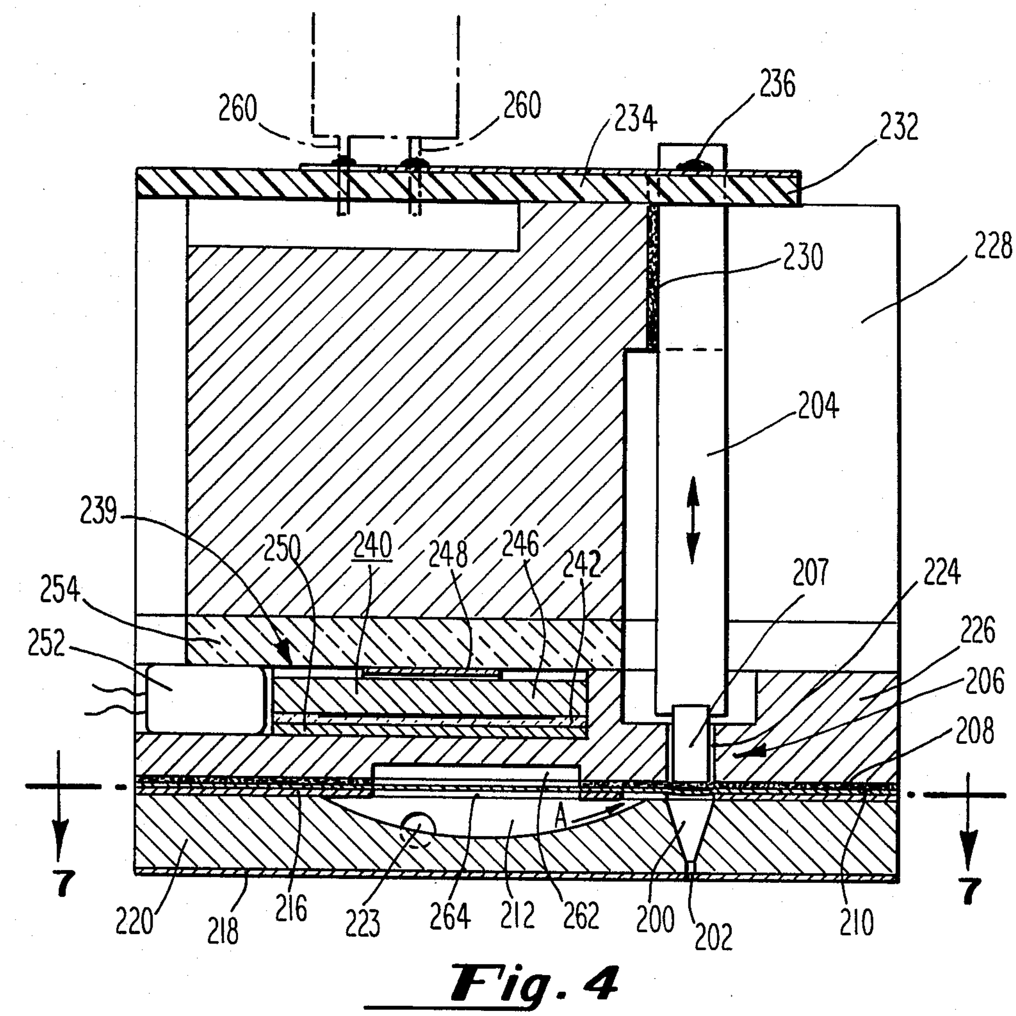
FIG. 4 is a sectional view of an ink jet assembly representing a preferred embodiment of the invention.
Figure 5:
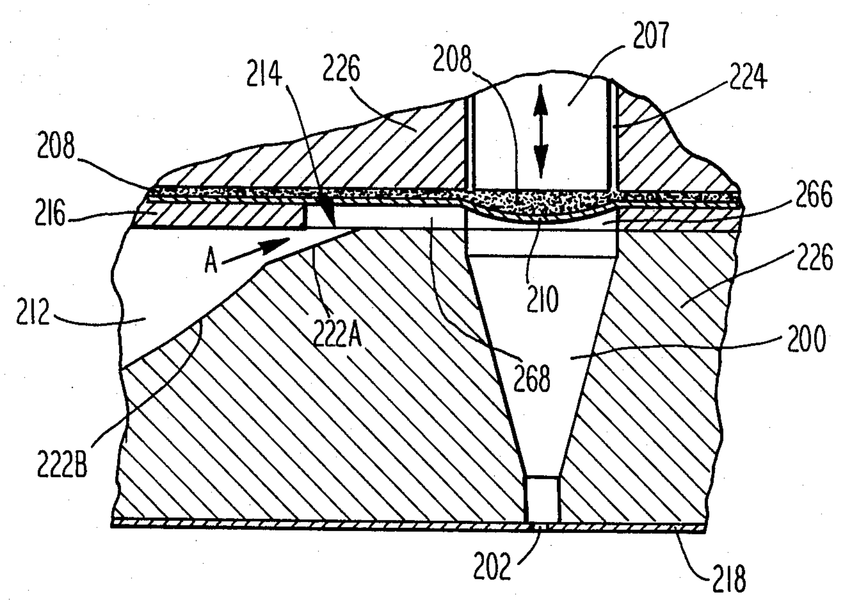
FIG. 5 is an enlargement of a portion of the sectional view of FIG. 4.
Figure 6:
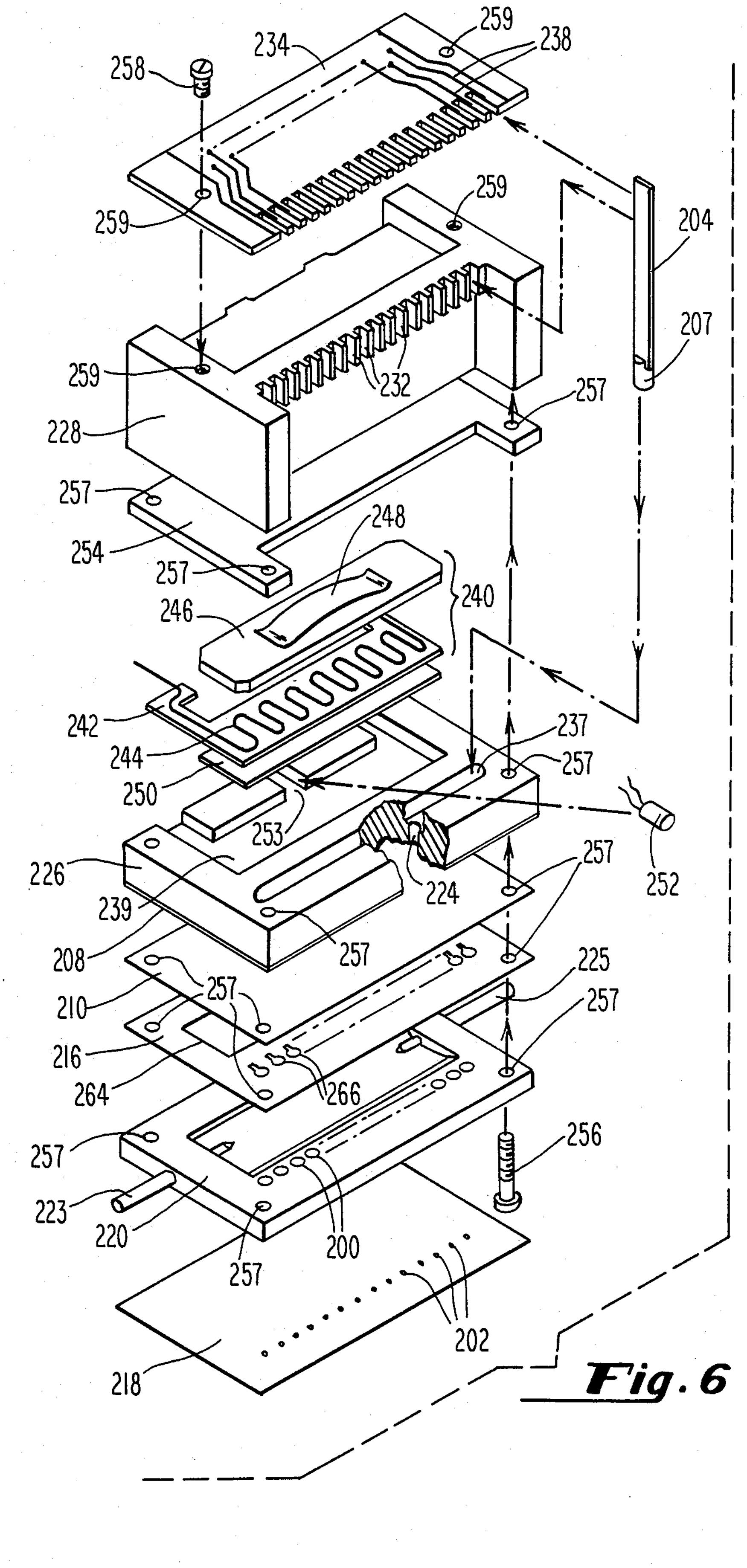
FIG. 6 is an exploded view of the assembly shown in FIG. 5.

Referring to FIGS. 4 through 6, the ink jet apparatus comprises a plurality of chambers 200 having orifices 202 for ejecting drops of ink in response to the state of energization of transducers 204. The transducers 204 which are rectangular in cross-section transverse to the axis of elongation expand and contract along the axis of elongation as depicted by the arrowhead shown in FIG. 4. The resulting movement of the transducers 204 along the axis of elongation is coupled into the chambers 200 by coupling means 206 including feet 207, a viscoelastic material 208 juxtaposed to the foot 207 and a diaphragm 210 which is preloaded to a position best shown in FIG. 5 in accordance with the invention of copending application Ser. No. 336,601, filed Jan. 4, 1982 which is assigned to the assignee of this invention and incorporated herein by reference.

Ink flows into the chambers 200 from a reservoir 212 through a restricted inlet means provided by restricted openings 214 best shown in FIG. 5. The inlets 214 comprise openings in the restrictor plate 216.

In accordance with the invention of copending application Ser. No. 336,602, filed Jan. 4, 1982, the reservoir 212 which is formed by a chamber plate 220 covered by the plate 216 tapers to an acute angle A along one side of the reservoir 212 leading to the inlet 214. The angle which preferably is less than 30 degrees allows the surface tension and wetting properties of the ink to fully prime the jet thereby minimizing the possibility that bubbles will be formed. As shown in FIG. 5, the acute angle is formed by a surface **221*a* which connects with the concave surface 221*b* of the radius of curvature which is substantially larger than the overall or maximum depth of the reservoirs best shown in FIG. 4**.

In accordance with this invention, a feeder input tube 223 shown in FIGS. 4 and 6 supplies the reservoir 212 with ink at one end of the reservoir. A vent tube 225 communicates with the reservoir 212 at the opposite end. In further accordance with this invention, the vent tube 225 may be opened during priming as shown in FIG. 6. A cap 225 may then be applied after priming is completed.

In accordance with the invention of copending application Ser. No. 336,600, filed Jan. 4, 1982, and Ser. No. 336,672, filed Jan. 4, 1982, assigned to the assignee of this invention and incorporated herein by reference, each of the transducers 204 as shown in FIGS. 4 through 6 are guided at the extremities thereof with intermediate portions of the transducers 204 being essentially unsupported as best shown in FIG. 4. One extremity of the transducers 204 is guided by the cooperation of the foot 207 with a hole 224 and a plate 226. As shown in FIGS. 4 and 6, the hole 224 in the plate 226 is slightly larger in diameter than the diameter of the foot 207. As a consequence, there need be very little contact between the foot 207 and the wall of the hole 224 with the bulk of the contact which locates the foot 207 and thus supports the transducer 204 coming from the viscoelastic layer 208 as best shown in FIG. 5. The other extremity of the transducer 204 is compliantly mounted in a block 228 by means of a compliant or elastic material 230 such as silicone rubber in accordance with the invention of the aforesaid copending application Ser. No. 336,600 which is incorporated herein by reference. The compliant material 230 is located in slots shown in FIG. 6 so as to provide support for the other extremity of the transducers 204. Electrical contact for the transducers 204 is also made in a compliant manner by means of a compliant printed circuit 234 shown in FIGS. 4 and 6 which is electrically coupled by suitable means such as solder 236 to the transducer 204. As shown in FIG. 6, the conductive patterns 238 are provided on the printed circuits 234.

As shown in FIGS. 4 and 6, the plate 226 including the holes 224 at the base of a slot 237 receiving the transducer 234 also includes a receptacle 239 for a heater sandwich 240 including a heater element 242 with coils 244, a hold down plate 246, a spring 248 associated with the plate 246 and a support plate 250 located immediately beneath the heater 240. In order to control the temperature of the heater 242, a thermistor 252 is provided which is received in a slot 253. The entire heater 240 is maintained within the receptacle in the plate 226 by a cover plate 254.

As shown in FIG. 6, the entire structure of the ink jet apparatus including the various plates or laminations are held together by means of bolts 256 which extend upwardly through openings 257 and the structure and bolts 258 which extend downwardly through holes 259 so as to hold the printed circuit board 234 in place on the plate 228. Not shown in FIG. 6 but depicted in dotted lines in FIG. 4 are connections 260 to the printed circuit 238 on the printed circuit board 234. The viscoelastic layer 208 adheres to the base of the plate 226 as depicted in FIG. 5.

The reservoir 212 is at least partially compliant, and more specifically, includes a compliant wall portion. As shown in FIG. 4, the diaphragm 210 extends across the entire apparatus so as to cover the reservoir 212 and extend between the foot 207 and the chamber 200. Thus, the diaphram 210 is in direct communication with the reservoir 212 on one side and juxtaposed to an entire area of relief 262 on the opposite side of the diaphragm 210. This area of relief which extends along the length of the reservoir, i.e., from the first chamber 200 to the last chamber 200 in the plate chamber 220 as shown in FIG. 6, provides a compliant wall for the reservoir 212 which minimizes cross-talk between the various ink jet chambers. It will be observed that the restrictor plate 216 includes an opening 264 aligned with the area of relief 262 so as to provide direct communication between the diaphragm 210 and the reservoir thereby providing necessary compliance. A slot 268 provides the inlet 214 to the chamber 200 while the opening 266 permits direct communication between the diaphragm 210 and the chamber 200 which couples the movement of the transducer 204 as transmitted to the foot 207 into the chamber 200.

Figure 7:
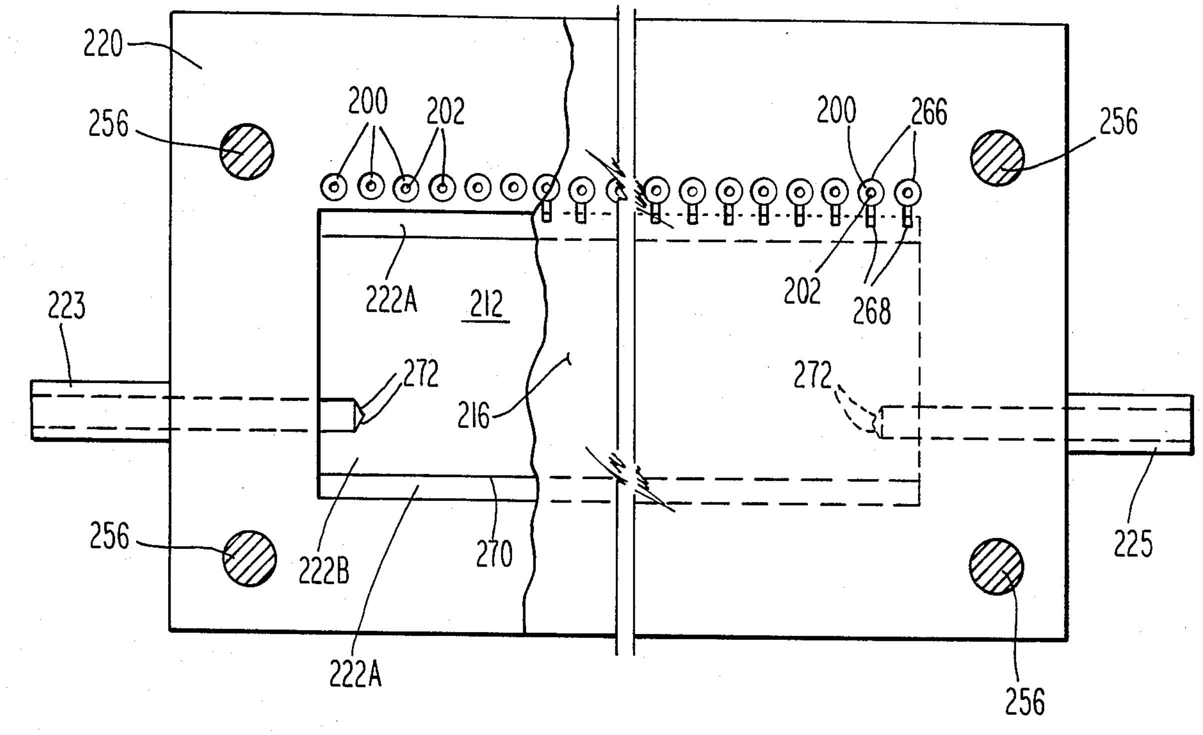
FIG. 7 is a plan view of the apparatus of FIG. 4 taken along lines 7—7.

Reference will now be made to FIG. 7 for a further appreciation of the nature of the relationship of the reservoir 212 to the chambers 200 in the array, the inlet feedpipe 223 and the vent pipe 225. As shown in FIG. 7, a surface 222B does join with a surface 222A so as to form the line 270 shown in FIG. 7. The edge represented by the line 270 is perhaps best shown in FIG. 6. It is not so sharp as to substantially interfere with the effect of tension and wetting of the ink in the reservoir 212 as the ink proceeds during priming toward the inlets 214 as shown in FIG. 6. It will also be observed that the inlet feed pipe 223 and the vent pipe 225 includes tapered surfaces 272 which feed into and from the reservoir 212 so as to minimize the formation of bubbles.

It will be appreciated that the embodiment of FIGS. 4 through 7 will also provide a high velocity flow of ink past the inlets to the various chambers 200, so as to assure proper priming, particularly where the vent pipe 225 is open during priming and then closed after priming by application of the gap 225c.

Although embodiments of the invention have been shown and described, it should be understood that other embodiments and modifications will occur to those of ordinary skill in the art which will fall within the true spirit and scope of the accompanying claims.

We claim:

1. An ink jet apparatus for producing droplets of ink on demand comprising:

- a chamber for receiving ink including an ink inlet and orifice for ejecting droplets of ink;
- transducer means coupled to said chamber for creating selective volumetric changes in said chamber in response to the state of energization of said transducer for ejecting droplets of ink on demand;
- ink supply means including an input and a vent to atmosphere for supplying ink to said chamber, said supply means creating a flow of ink during priming through said supply means from said input, past said inlet to said vent; and
- valve means coupled to said vent so as to permit said vent to be opened during priming and closed after priming.

2. The ink jet apparatus of claim 1 further comprising means for pressurizing ink in said supply means for creating said flow of ink through said supply means.

3. An ink jet apparatus for producing droplets of ink from an array on demand comprising:

- a plurality of chambers for receiving ink including respective ink inlets and orifices in said array for ejecting droplets of ink on demand;
- transducer means coupled to each of said chambers for creating selective volumetric changes in said chamber in response to the state of energization of said transducer means for ejecting droplets of ink on demand; and
- manifold means including an input and a vent for supplying ink to each said chamber, said manifold means creating a substantial flow of ink therethrough from said input, past said inlet of said chamber and into said vent, said manifold means comprising a plurality of scoops along said manifold means, said scoops being respectively coupled to said vents.

4. The ink jet apparatus of claim 3 wherein said inlets are substantially aligned.

5. The ink jet apparatus of claim 3 wherein said scoops are differentially displaced with respect to the axis of said manifold means.

6. The ink jet apparatus of claim 3 wherein said manifold means is reduced in cross-sectional area transverse to the flow of ink at each of said inlets.

7. The ink jet apparatus of claim 3 wherein said inlets respectively comprise a reservoir.

8. The ink jet apparatus of claim 3 further comprising valve means coupled to said vents so as to permit said vent to be opened during priming and closed after priming.

9. The ink jet apparatus of claim 3 further comprising means for pressurizing ink in said supply means for creating a flow of ink through said manifold means.

10. A method of priming a demand ink jet comprising a chamber for receiving ink including an ink inlet and orifice for ejecting droplets of ink and transducer means coupled to said chamber for creating selective volumetric changes in said chamber in response to the state of energization of said transducer for ejecting droplets of ink on demand, the method comprising the following steps:

- flowing ink into the chamber through said inlet during priming;
- simultaneously flowing ink past said inlet toward a vent during priming; and
- closing the vent at the conclusion of priming while ejecting droplets.

11. A method of priming a plurality of demand ink jets comprising a plurality of chambers for receiving ink including inlets and orifices for ejecting droplets of ink and transducer means coupled to said chambers for creating selective volumetric changes in said chambers in response to the state of energization of said transducer means for ejecting droplets on demand, the method comprising the following steps:

- flowing ink in the chambers through said inlet;
- simultaneously flowing ink past said inlet toward a vent during priming; and
- closing the vent at the conclusion of priming while ejecting droplets.

12. The method of claim 11 wherein the ink is flowed serially past the inlets to the chambers.

13. The method of claim 12 wherein the cross-sectional area of ink flowing past subsequent inlets in the serial flow of ink is less than the cross-sectional area of the flow of ink leading to the preceding serial inlet.

14. An ink jet apparatus for producing droplets of ink from an array on demand comprising:

- a plurality of chambers for receiving ink including respective ink inlets and orifices in said array for ejecting droplets of ink on demand;
- transducer means coupled to each of said chambers for creating selective volumetric changes in said chamber in response to the state of energization of said transducer means for ejecting droplets of ink on demand; and
- manifold means including an input and a vent for supplying ink to each said chamber, said manifold means creating a substantial flow of ink therethrough from said input, past said inlet of said chamber and into said vent, said manifold means being reduced in cross-sectional area transverse to the flow of ink at each of said inlets.

15. An ink jet apparatus for producing droplets of ink from an array on demand comprising:

a plurality of chambers for receiving ink including respective ink inlets and orifices in said array for ejecting droplets of ink on demand;

transducer means coupled to each of said chambers for creating selective volumetric changes in said chamber in response to the state of energization of said transducer means for ejecting droplets of ink on demand;

manifold means including an input and a vent to atmosphere for supplying ink to each said chamber, said manifold means creating a substantial flow of ink therethrough from said input, past said inlet of said chamber and into said vent; and valve means coupled to said vent so as to permit said vent to be opened during priming and closed after priming.

* * * * *